Oct. 14, 1947.    M. BARLICK    2,429,180
GENERATOR OR MOTOR FIELD STRUCTURE
Filed Oct. 14, 1944

INVENTOR.
Michael Barlick
BY R. J. Schwarz
ATTORNEY.

Patented Oct. 14, 1947

2,429,180

UNITED STATES PATENT OFFICE 2,429,180

GENERATOR OR MOTOR FIELD STRUCTURE

Michael Barlick, Chicago, Ill., assignor to Products Development, Inc., Chicago, Ill., a corporation of Illinois Application October 14, 1944, Serial No. 558,702

4 Claims. (Cl. 171—252)

1

This invention relates to improvements in the field structures of electrical machines such as generators or motors, and more especially concerns improvements involving the field poles.

Certain limitations have heretofore necessarily restricted the construction of the laminated pole tips in generators or motors, such as the tendency of the laminations to spread apart at the tips and to vibrate, often with audible frequency, when exceeding a certain length for any given pole size and lamination thickness or guage. On the other hand, from the standpoint of electrical efficiency it is desirable to have the pole tips as long as possible to increase the width of the pole faces and improve the magnetic flux distribution.

An important object of the present invention is to provide a novel construction which makes possible the use of unconventionally thin or long pole tips.

Another object is to provide novel means for avoiding spreading of the laminations in the pole tips.

Still another object of the invention is to provide novel means for soundproofing a generator or motor field unit.

A further object of the invention is to provide novel means adapted for use with the field pole tips of a generator or motor either in a new construction or in an existing construction in which there is need for means to confine the pole tip laminations against either joint or relative movement.

Yet another object is to provide improved means operative to confine the field coils against spreading beyond the pole face perimeter.

Other objects, features, and advantages of the present invention will be readily apparent from the following detailed description taken in connection with the accompanying one sheet of drawings, in which.

Figure 1:
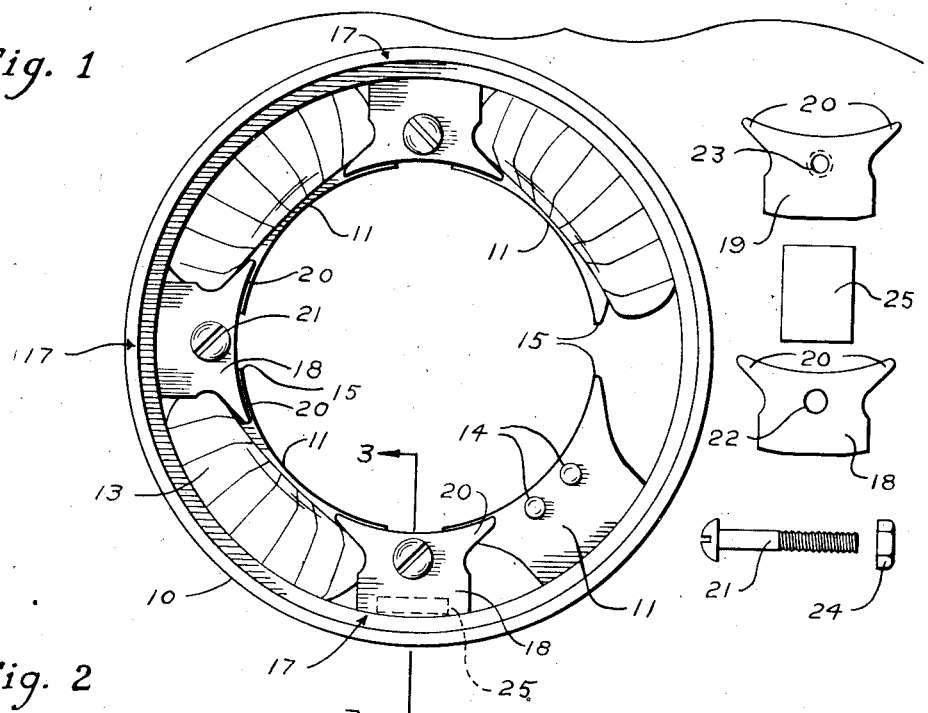
Figure 1 is a side elevational view of a motor or generator field structure embodying the features of my invention and with certain parts disassembled.
Figure 2:
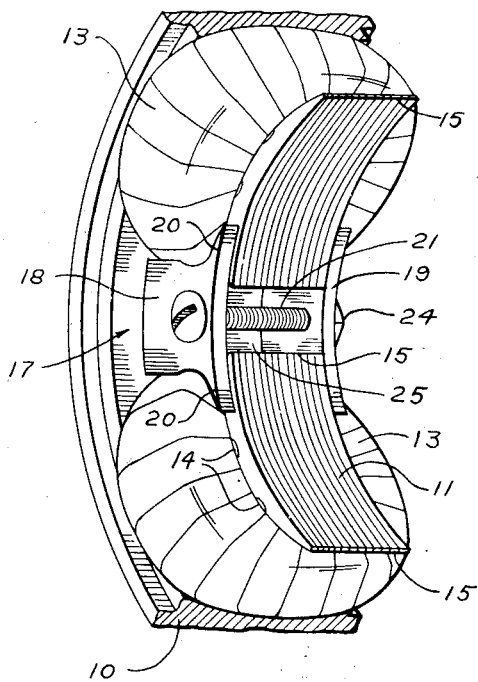
Fig. 2 is a slightly enlarged fragmentary inside isometric view of a sector of the field structure showing certain details of the construction.

Having more particular reference to the drawing, the invention is shown as embodied in a more or less conventional type of field structure for a small generator or motor including a supporting ring 10 carrying internally a plurality of laminated equidistantly spaced poles 11, herein

2 shown as four in number secured thereto in any preferred manner. Each of the poles 11 carries a magnetizing coil 13. Any preferred means such as riveted tie rods or rivets 14 may be employed to secure together the lamination stacks forming each of the poles 11. The rivets 14 extend through the body portions of the laminations spaced inwardly from the side edges. As is customary, the exposed inner face of each of the poles has a concave profile on an arc substantially concentric with the ring 10 and thereby with the rotor (not shown) which will spin within the field in the ultimate assembly.

Each of the poles 11 is formed with oppositely extending pole tips 15 serving the dual purposes of retainers for the associated coil 13 and of widening extensions of the associated pole face. It is, of course, desirable to have the pole faces as wide as possible in order to gain the greatest practicable magnetic flux distribution. A serious limitation upon the length of the pole tips and thereby upon the width of the pole faces has heretofore resided in the tendency of the laminations to spread apart at the tips and also in the tendency of the pole tips to vibrate with harmonic frequency due to the magnetic flux forces during operation. Since the pole tips 15 extend to a substantial distance beyond the side edges of the laminations the clamping effect of the rivets 14 is lost to a substantial extent, allowing the tips to force apart.

According to the present invention, the pole tips 15 can be made as long as preferred, as narrow as preferred, and of any preferred thin guage of lamination stock. To this end, the tips are effectively secured against spreading of the laminations and against vibrating with audible frequency. The means for this purpose also preferably binds adjacent pole tips firmly together and is solidly based on the field ring 10 to prevent vibration of the tips relative to the ring. Herein such means comprise clamps identified generally by the numeral 17. Each of the clamps 17 comprises an opposed pair of clamp plates 18 and 19 formed from a relatively stiff, non-magnetic material such as hard brass of a thickness and hardness adequate to withstand with ample margin of safety the stresses and strains imposed in use. In contour the clamp plates 18 and 19 are preferably identical. Thus each of the clamp plates is of a shape approximating that of a pole lamination with a body portion of a width to fit between the coils of adjacent poles and of a height to extend from the inner periphery of the field ring 10 to approximately the face perimeter of the poles. The width of the clamp plates is also adequate to bridge the gap between adjacent pole tips. For clamping engagement with the pole tips 15 the clamp plates are formed with opposite laterally extending clamping arms 20 which are of a length to overlap the opposed outer faces of the adjacent pole tips 15 to a liberal extent and preferably throughout the major portion of the lengths of the tips. As best seen in Fig. 1 such overlapping preferably extends from the extremities of the pole tips approximately to where the tips join the body of the respective poles and the body portions of the clamp plates solidly bridge the gap between the adjacent tips.

Those edges of the clamping arm 20 which oppose the coils 13 are preferably contoured to engage the coils with reasonable uniformity, and thus serve to tie the coils down and also to confine the coil wrappings against swelling when baking varnish thereon or the like and tending to protrude beyond the pole face periphery.

Figure 3:
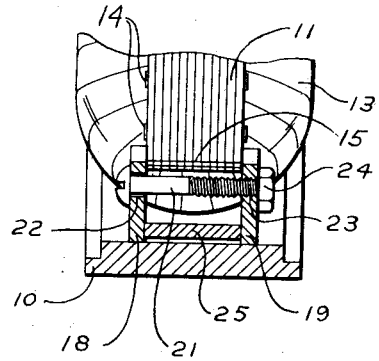
Fig. 3 is a transverse sectional view taken substantially in the plane of the line 3—3 of Fig. 1.

Securing the pairs of clamping plates 18 and 19 clampingly together are means such as bolts 21. Each of the bolts 21 is preferably located at the longitudinal center of the clamp and as close as practicable to the inner edges of the clamp plates so that when the plates are drawn together the clamping force will be exerted equally and with the greatest practicable efficiency through the clamping arms 20 directly against the pole tips 15. By preference, the bolt 21 extends freely through a bolt hole 22 in the clamping plate 18 and is threaded through a tapped bolt hole 23 in the clamp plate 19 (Fig. 3) whereby to draw the clamp plates together by tightening the bolt. The preferred clamping condition is then maintained by a lock nut 24.

In order to assure that the full clamping force of the arms 20 will be directed toward the pole tips 15, the bases of the clamp plates 18 and 19 are held in predetermined spaced relation by means such as a spacer or fulcrum bar 25. This bar 25 while holding the bases of the clamp plates spaced apart to a distance at least equal to the thickness of the poles 11, forces the clamp plates 18 and 19 to rock toward one another when drawn together by the clamping bolt 21. Since the clamping bolt 21 is located closer to the clamping arms 20 than to the fulcrum bar 25 it will be apparent that the major clamping force exerted by the bolt on the clamp plates 18 and 19 will be concentrated in the clamping arms.

As a result, the laminations in the pole tips 15 will be quite tightly clamped together and held against any tendency to vibrate perpendicularly to their plane. Any tendency of the pole tips 15 to vibrate in the plane of the laminations is constrained by the manner in which the clamps 17 tie adjacent pole tips together so as to prevent independent vibrational action and also by the solid supports afforded by the clamp plates 18 and 19 resting solidly at their base edges against the field ring 10.

From the foregoing it will be apparent that the present invention affords several important advantages among which may be mentioned soundproofing of the poles and in particular the tips thereof inexpensively and effectively without alterations in the existing design because the pole tip clamps occupy existing space in the field structure. The pole tips may be made substantially longer than in conventional practice thus permitting the air gaps between the pole tips to be cut to a minimum and substantially improving the magnetic flux distribution over the lengthened pole faces. Improved magnetic action is also possible through the use of the thinnest practicable guage material for the laminations of the poles, since spreading of the pole tips and vibrations thereof are effectively prevented.

While I have illustrated and described a preferred embodiment of my invention, it is to be understood that I do not thereby intend to limit my invention to the specific details disclosed, but contemplate that certain modifications, substitutions, and alternative constructions may be effected without departing from the spirit and scope of the invention as defined in the appended claims.

I claim:

1. In combination in a structure of the character described, a pair of laminated magnetic poles having projecting pole tips in adjacent spaced relation, exciter coils carried by said poles, complementary clamp plates mounted in the spaces between the coils of adjacent poles and having oppositely extending clamping arms for engaging the opposing faces of opposing pole tips, and means for drawing the clamp plates together to press the pole tips together between said arms.

2. In combination in a construction including laminated poles having relatively thin tips in proximate spaced relation, a pair of clamp members engaging said tips between them, means adjacent to said tips for securing the clamping members together, and fulcrum means cooperating with said members in a location remote from said tips to direct the principal clamping force of said members under the influence of said securing means toward said tips.

3. A combination as set forth in claim 2 in which said securing members comprise clamping plates and the securing means comprises a bolt passing freely through one of the plates and into threaded engagement with the other plate.

4. In combination in a construction including laminated poles having relatively thin tips for proximate spaced relation, a pair of clamp members engaging said tips between them, means adjacent to said tips for securing the clamping members together, and a spacer plate between said clamping members in a location remote from said tips to direct the principal clamping force of said members under the influence of said securing means toward said tips.

MICHAEL BARLICK.

REFERENCES CITED

The following references are of record in the file of this patent:

UNITED STATES PATENTS

| Number | Name | Date |
|---|---|---|
| 571,462 | Thomson | Nov. 17, 1896 |
| 815,847 | Mallett | Mar. 20, 1906 |
| 911,364 | Balcome | Feb. 2, 1909 |
| 1,145,081 | Politowski | July 6, 1915 |
| 1,422,145 | Stark | July 11, 1922 |
| 1,593,230 | Varley | July 20, 1926 |

FOREIGN PATENTS

| Number | Country | Date |
|---|---|---|
| 590,670 | France | Mar. 23, 1925 |